United States Patent
Yildiz et al.

(10) Patent No.: US 11,026,044 B1
(45) Date of Patent: Jun. 1, 2021

(54) DETERMINING EXPOSURE TO AN OUTDOOR DISPLAY UNIT

(71) Applicant: FIREFLY SYSTEMS INC., San Francisco, CA (US)

(72) Inventors: Vedat Taylan Yildiz, San Mateo, CA (US); Kaan Gunay, San Francisco, CA (US); Onur Kardesler, San Francisco, CA (US)

(73) Assignee: FIREFLY SYSTEMS INC., San Francisco, CA (US)

( * ) Notice: Subject to any disclaimer, the term of this patent is extended or adjusted under 35 U.S.C. 154(b) by 0 days.

(21) Appl. No.: 16/909,329

(22) Filed: Jun. 23, 2020

(51) Int. Cl.
| | |
|---|---|
| *H04W 4/021* | (2018.01) |
| *H04W 4/40* | (2018.01) |
| *H04W 4/029* | (2018.01) |
| *H04W 4/02* | (2018.01) |

(52) U.S. Cl.
CPC .......... *H04W 4/021* (2013.01); *H04W 4/023* (2013.01); *H04W 4/029* (2018.02); *H04W 4/40* (2018.02)

(58) Field of Classification Search
CPC .......... G06Q 30/0261; G06Q 30/0265; G06Q 30/0205; G06Q 30/02; H04L 67/22; H04L 67/24; H04W 4/029; H04W 4/02; H04W 4/30; G06F 16/9537
See application file for complete search history.

(56) References Cited

U.S. PATENT DOCUMENTS

| | | | | |
|---|---|---|---|---|
| 6,484,148 | B1 * | 11/2002 | Boyd | G06Q 30/02 340/8.1 |
| 6,812,851 | B1 * | 11/2004 | Dukach | G06Q 30/02 340/425.5 |
| 7,155,159 | B1 * | 12/2006 | Weinblatt | H04H 60/372 455/2.01 |
| 9,293,042 | B1 * | 3/2016 | Wasserman | G08G 1/09 |
| 9,848,027 | B2 * | 12/2017 | Chen | H04L 65/60 |
| 10,535,078 | B2 * | 1/2020 | Parekh | G06Q 30/0261 |
| 10,552,871 | B1 * | 2/2020 | Chadwick | G06Q 30/0269 |
| 10,783,559 | B1 * | 9/2020 | Tran | G06K 9/00845 |
| 2002/0164962 | A1 * | 11/2002 | Mankins | G06Q 30/02 455/99 |
| 2004/0036622 | A1 * | 2/2004 | Dukach | G09F 27/00 340/691.6 |

(Continued)

*Primary Examiner* — Dung Hong
(74) *Attorney, Agent, or Firm* — Maschoff Brennan (57) ABSTRACT

The present disclosure generally relates to determining an estimated number of people at a geographic location who may be exposed to an outdoor display unit, such as mobile display unit, configured to display information in an outdoor environment. The determination may involve identifying, based on obtained data relating to unique mobile device users identified within a predetermined distance of the mobile display unit, a first number of people within the predetermined distance. The method may also involve correlating the first number of people with a previously determined total number of people within the predetermined distance of the mobile display unit at the geographic location and associated with a previously determined number of unique mobile device users within the predetermined distance of the mobile display unit at the geographic location, and determining, based on the correlating, an estimated total number of people within the predetermined distance of the mobile display unit.

14 Claims, 5 Drawing Sheets

(56) References Cited

U.S. PATENT DOCUMENTS

| | | | | |
|---|---|---|---|---|
| 2008/0077469 A1* | 3/2008 | Philport | G06Q 30/02 705/7.32 |
| 2008/0172781 A1* | 7/2008 | Popowich | G09F 27/00 4/476 |
| 2009/0197616 A1* | 8/2009 | Lewis | H04M 3/4878 455/456.1 |
| 2009/0265729 A1* | 10/2009 | Weinblatt | H04H 60/45 725/19 |
| 2009/0299857 A1* | 12/2009 | Brubaker | G06Q 30/0247 705/14.66 |
| 2010/0191631 A1* | 7/2010 | Weidmann | H04N 7/17318 705/34 |
| 2012/0290383 A1* | 11/2012 | Busch | G06Q 30/02 705/14.36 |
| 2013/0006775 A1* | 1/2013 | Jordan | G08G 1/20 705/14.62 |
| 2013/0083313 A1* | 4/2013 | Iizuka | H04L 67/20 356/72 |
| 2013/0325615 A1* | 12/2013 | Lee | G06Q 30/0267 705/14.58 |
| 2014/0257969 A1* | 9/2014 | Topchy | G06Q 30/0242 705/14.42 |
| 2014/0379477 A1* | 12/2014 | Sheinfeld | G06Q 30/0251 705/14.58 |
| 2015/0150035 A1* | 5/2015 | Chizi | H04N 21/812 725/14 |
| 2015/0326922 A1* | 11/2015 | Givon | H04N 21/25891 725/10 |
| 2016/0110759 A1* | 4/2016 | Polehn | G06Q 30/0251 705/14.49 |
| 2016/0117688 A1* | 4/2016 | Ghosh | H04W 4/027 705/7.29 |
| 2016/0180392 A1* | 6/2016 | Liu | G06Q 30/0267 705/14.53 |
| 2016/0232572 A1* | 8/2016 | East | H04W 4/40 |
| 2016/0292713 A1* | 10/2016 | Chen | G06Q 30/0242 |
| 2016/0381110 A1* | 12/2016 | Barnett | H04L 65/601 709/231 |
| 2017/0371608 A1* | 12/2017 | Wasserman | G06Q 30/0261 |
| 2018/0075486 A1* | 3/2018 | Hannant | G06Q 30/0261 |
| 2018/0150872 A1* | 5/2018 | Kanagy | G06Q 30/0259 |
| 2018/0349948 A1* | 12/2018 | Dow | G06Q 30/0244 |
| 2019/0050904 A1* | 2/2019 | Wasserman | G08B 5/00 |
| 2019/0088176 A1* | 3/2019 | Isaacs | G09F 27/005 |
| 2019/0268743 A1* | 8/2019 | Cho | G08G 1/096791 |
| 2019/0311404 A1* | 10/2019 | Wasserman | E01F 9/00 |
| 2020/0098007 A1* | 3/2020 | Sakurada | H04W 4/029 |
| 2020/0250708 A1* | 8/2020 | Surygina | H04L 67/18 |

\* cited by examiner

DETERMINING EXPOSURE TO AN OUTDOOR DISPLAY UNIT

FIELD

The present disclosure generally relates to determining exposure to an outdoor display unit.

BACKGROUND

Unless otherwise indicated herein, the materials described herein are not prior art to the claims in the present application and are not admitted to be prior art by inclusion in this section.

Various display units may be used in an outdoor setting to provide information to people coming into contact with the display unit. The display units may be stationary such that information from the display units may be provided to people who move into visible range of the display units. The display units may also be mobile such that the display units may be moved to a number of different geographic locations. For example, a mobile display unit may be mounted to a vehicle which may move the mobile display unit to different geographic locations. In the case of mobile display units, information from the display unit may be provided to people who move into visible range of the display unit or it may be provided to people to whom the display unit is moved into their visible range.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In one embodiment, a method includes identifying a geographic location of a mobile display unit configured to display information in an outdoor environment; obtaining data relating to unique mobile device users identified within a predetermined distance of the mobile display unit at the geographic location; identifying, based on the obtained data, a first number of people within the predetermined distance of the mobile display unit at the geographic location; correlating the first number of people with a previously determined total number of people within the predetermined distance of the mobile display unit at the geographic location and associated with a previously determined number of unique mobile device users within the predetermined distance of the mobile display unit at the geographic location; and determining, based on the correlating, an estimated total number of people within the predetermined distance of the mobile display unit at the geographic location.

In another embodiment, a system includes one or more processors and one or more non-transitory computer-readable media containing instructions. In response to being executed by the one or more processors, the instructions cause the system to perform operations including identifying a geographic location of a mobile display unit structured to display information in an outdoor environment; identifying unique mobile device users within a predetermined distance of the mobile display unit at the geographic location; identifying a first number of people within the predetermined distance of the mobile display unit at the geographic location; and correlating the first number of people with a previously determined total number of people within the predetermined distance of the mobile display unit at the geographic location and associated with a previously determined number of unique mobile device users within the predetermined distance of the mobile display unit at the geographic location; and determining, based on the correlating, an estimated total number of people within the predetermined distance of the mobile display unit at the geographic location.

In still another embodiment, one or more non-transitory computer-readable media contain instructions which, in response to being executed by one or more processors, cause a system to perform operations including identifying a geographic location of a mobile display unit structured to display information in an outdoor environment; identifying a number of unique mobile device users within a predetermined distance of the mobile display unit at the geographic location; and determining an estimated total number of people within the predetermined distance of the mobile display unit at the geographic location by comparing the number of unique mobile device users identified within the predetermined distance of the mobile display unit at the geographic location with a previously determined total number of people within the predetermined distance of the mobile display unit at the geographic location which includes a predetermined number of unique mobile device users within the predetermined distance of the mobile display unit at the geographic location.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict one non-limiting typical embodiment of the invention and are therefore not to be considered limiting of its scope. The invention will be described and explained with additional specificity and detail through the use of the accompanying drawings in which.

DETAILED DESCRIPTION

The present disclosure generally relates to determining an estimated number of people who are, or may be, exposed to an outdoor display unit. More particularly, but not exclusively, the present disclosure relates to determining an estimated number of people at a geographic location within a predetermined distance of a mobile display unit configured to display information in an outdoor environment. Although the embodiments are described in the context of a mobile display unit, it will be appreciated that embodiments disclosed herein may be employed in other fields and/or operating environments where the functionality disclosed herein may be useful. Accordingly, the scope of the invention should not be construed to be limited to the exemplary implementations and operating environments disclosed herein.

Outdoor display units may provide a variety of information, including for example road conditions, weather conditions, emergency alerts, and notices relating to goods, services, and events, amongst other things. Determining the effectiveness of outdoor display units in providing information to people, or even the exposure of outdoor display units to people, may be challenging. For example, one measure of determining exposure may rely on a few days of real observations of exposure to the outdoor display unit to represent an average day of a full year or more. Amongst other things, this approach may lead to an inaccurate determination of the people estimated to have been exposed to an outdoor display unit on a given day as the data obtained from the few days of observation may not be truly representative of actual, average exposure. For example, the exposure on the days of observation could be relatively higher or lower compared to normal days. In addition, even if the few days of real observations were representative of normal days, that information would not be helpful for determining an estimated number of people exposed to the display unit on a given day or a given time on a given day when the actual number of people exposed to the display unit is significantly higher of lower than normal.

Similarly, without a robust approach for determining exposure to an outdoor display unit, it may be challenging to assess the reach and the effectiveness of the outdoor display unit in providing information to the public. As a corollary, without such information, it may be difficult to change aspects of the display unit including its location and characteristics thereof in order to produce more effective and greater exposure to the information provided by the display unit, thereby increasing the likelihood that people may not be exposed to potentially important information provided by the display unit.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Figure 1:
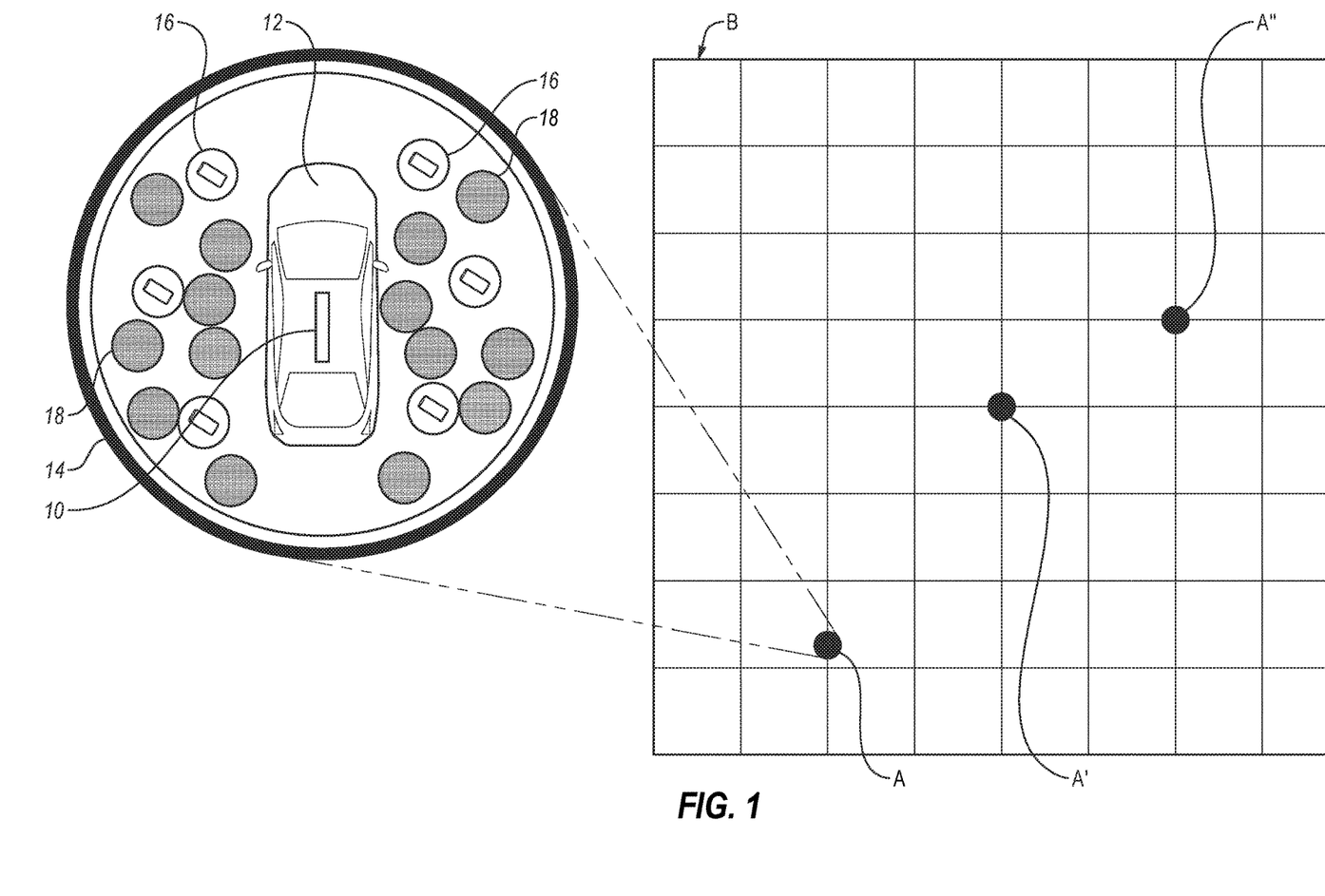
FIG. 1 is a schematic illustration of an outdoor display unit mounted to a vehicle at a particular geographical location.

FIG. 1 is a schematic illustration of an outdoor display unit mounted to a vehicle located at a particular location. More particularly, in FIG. 1 an outdoor display unit in the form of a mobile display unit 10 is mounted to a vehicle 12. The mobile display unit 10 may include a screen which may provide visual information to people who are exposed to the mobile display unit 10. In addition, the mobile display unit 10 may also include an audio source such as one or more speakers from which audible information may be provided to people who are exposed to the mobile display unit 10. The mobile display unit 10 may provide a variety of information, including for example road conditions, weather conditions, emergency alerts, and notices relating to goods, services, and events, amongst other things.

The mobile display unit 10 may provide the same information across a number of different locations, specific information based on a particular location, or varying information at one or more locations. For example, when the mobile display unit 10 is at a first given location, the screen thereof may display information which is relevant or tailored to the first given location, and when the mobile display unit 10 is at second given location, it may display different information which is relevant or tailored to the second given location. In one form, the mobile display unit 10 may be wirelessly connected to a remote server and the content or information provided on the screen of the mobile display unit 10 may be remotely updated or changed and/or the manner in which the information is displayed may be changed. Similarly, instances in which there becomes an urgent need for the mobile display unit 10 to provide information relating to a public service announcement for example, relevant instructions may be provided to the mobile display unit 10 that cause a change in the screen of the mobile display unit 10 to provide information relating to the public service announcement. The information provided by the mobile display unit 10 may also depend on factors such as time of day, weather, and status of local or other events.

In FIG. 1, the vehicle 12 on which the mobile display unit 10 is mounted is located at geographical location A within a representative geographical region B. The geographical region B is illustrated in the form of a gridwork which may, for example, be representative of intersecting streets in a city or town. Similarly, the geographical region B may be representative of a city or town, or a portion of a city or town, although other possibilities are contemplated. The vehicle 12 may move the mobile display unit 10 to different geographical locations, including geographical locations A' and A" noted in FIG. 1, within the geographical region B. Forms in which the mobile display unit 10 may be moved out of the geographical region B by the vehicle 12 are also possible.

The mobile display unit 10 may include one or more components configured to provide information related to the geographical location of the mobile display unit 10. For example, the mobile display unit 10 may include one or more global positioning system (GPS) devices that provide the geographical position or location of the mobile display unit 10. Additionally or alternatively, the geographical position or location of the mobile display unit 10 may be provided by one or more GPS devices associated with the vehicle 12, or the location information may come from street level image data which obtained by a camera mounted on the mobile display unit 10 and processed to determine the location of the vehicle 12. In one or more embodiments, the geographical position or location of the mobile display unit 10 may be provided by information received from an electronic device (e.g., a cellular phone, a tablet, a laptop, a vehicular computing system, etc.) of an operator of the vehicle 12.

In FIG. 1, there are a number of individuals or people positioned within a predefined or predetermined distance of the mobile display unit 10. More specifically, the predetermined distance is defined by a circle 14 surrounding the vehicle 12. Variations in the shape and size of the predetermined distance are possible. In one non-limiting form, the size or length of the predetermined distance may correspond to a maximum distance and angle at which a person could view and/or read the information provided on the screen of the mobile display unit 10. The individuals designated with reference numeral 16 may include (e.g., are in possession of and/or using) portable electronic devices which facilitate unique identification of their location and proximity to the mobile display unit 10 within the circle 14. Similarly, based on this information, it is possible to quantitatively determine the number of the individuals 16 who are within the predetermined distance of the mobile display unit 10 at a given location and who have associated portable electronic devices that allow identification of their respective locations. In FIG. 1, the individuals 16 within the circle 14 are at location A in the geographical region B. However, it should be appreciated that individuals including portable electronic devices may also be present at locations A' and A" in the geographical region B, and these portable electronic devices may facilitate the identification of their location and proximity to the mobile display unit 10 within the circle 14 at the locations A' and A". Similarly, it is possible to quantitatively determine the number of individuals corresponding to the individuals 16 who are within the predetermined distance of the mobile display unit 10 at locations A' and A", amongst others, and include a portable electronic device that provides information facilitating the identification of their location.

In one form, the individuals 16 who include a portable electronic device that provides information facilitating the identification of their location within the predetermined distance of the mobile display unit 10 may be identified through a unique mobile advertising ID (MAID) such as an IDentifier for Advertisers (IDFA) or an AAID (Google/Android Advertising ID). The information facilitating identification of location may come from sources other than MAIDs as well. For example, it may come from any type of device identifier that is tied to the location of the portable electronic device. Regardless of their form, the device identifier may originate from a software developer kit (SDK) app integration or from a restful API, amongst other possibilities. While not previously discussed, it should be appreciated that the individuals 18 within the circle 14 either do not include portable electronic devices that provide information facilitating the identification of their location within the predetermined distance of the mobile display unit 10, or their portable electronic devices may not be providing this particular information at that certain point in time when they are within the predetermined distance of the mobile display unit 10. Reference to identification of an individual in the present disclosure may thus include identification of their mobile device.

In FIG. 1, there is a total of twenty individuals, with six individuals 16 having their location within the predetermined distance of the mobile display unit 10 identified and fourteen individuals 18 not having their location within the predetermined distance of the mobile display unit 10 identified. Similarly, in this scenario, it can be seen that the location of thirty percent of the individuals within the predetermined distance of the mobile display unit 10 may be identified as such by virtue of identification of relevant unique device identification information. Moreover, the information identifying the geographic location of the mobile display unit 10 and/or the locations of the portable electronic devices of the individuals 16 may identify the day and time at which the individuals are located within the predetermined distance of the mobile display unit 10. Collection of data of this nature, optionally in combination with other relevant data, may facilitate the later determination of an estimated total number of individuals within the predetermined distance of the mobile display unit 10 at a particular geographic location (or within some range thereof) based on the individuals 16 whose location within the predetermined distance of the mobile display unit 10 is identified at the later point in time.

Figure 2:
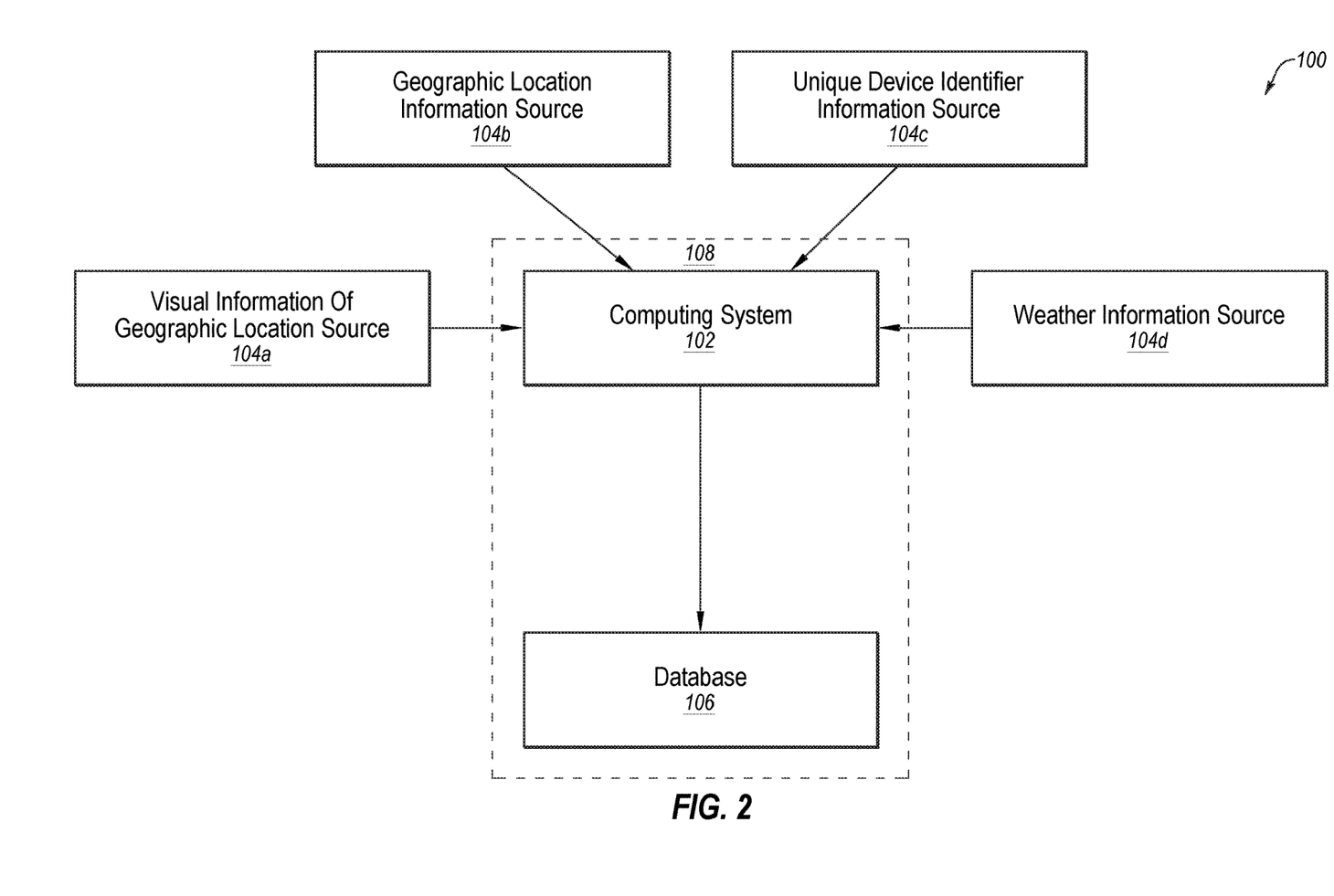
FIG. 2 is a schematic illustration of a system for obtaining information relating to the outdoor display unit of FIG. 1.

With reference now to FIG. 2, there is provided a schematic illustration of a system 100 for obtaining various information relating to the location A and exposure of the mobile display unit 10 in the setting illustrated in FIG. 1. It should be understood that the following description may also be relevant to obtaining information relating to the mobile display unit 10 at other locations and different exposure levels, and that this other information may facilitate later determination of an estimated total number of individuals within the predetermined distance of the mobile display unit 10 at the same or other geographic location(s) (or within some range thereof) based on the individuals 16 whose location within the predetermined distance of the mobile display unit 10 is identified at the later point in time at the same or other geographic location(s).

While not specifically identified, the system 100 may include a network which may be configured to communicatively couple components and devices internal and external to the system 100. As such, in some embodiments, components and devices of the system 100 may interact with each other and other devices and components via the network.

In some embodiments, the network may include a short-range wireless network, such as a wireless local area network (WLAN), a personal area network (PAN), or a wireless mesh network (WMN). For example, the network may include networks that use Bluetooth® Class 2 and Class 3 communications with protocols that are managed by the Bluetooth® Special Interest Group (SIG). Other examples of wireless networks may include the IEEE 802.11 networks (commonly referred to as WiFi®), Zigbee networks, among other types of LANS, PANS, and WMNS. In these or other embodiments, the network may include a wide area network (WAN) that may extend over a relatively large geographical area as compared to the geographical area that may be covered by a short-range wireless network. In some embodiments, the network may have numerous different configurations. In some embodiments, the network may include a peer-to-peer network.

Additionally or alternatively, the network may also be coupled to or may include portions of a telecommunications network for sending data in a variety of different communication protocols. In some embodiments, the network may include an Internet Protocol (IP) based network such as the Internet. In some embodiments, the network may include cellular communication networks for sending and receiving communications and/or data including via hypertext transfer protocol (HTTP), direct data connection, wireless application protocol (WAP), etc. The network may also include a mobile data network that may include third-generation (3G), fourth-generation (4G), long-term evolution (LTE), long-term evolution advanced (LTE-A), Voice-over-LTE, Voice-over-IP, or any other mobile data network or combination of mobile data networks.

In the system 100, a computing system 102 may receive information relating to the geographic location A and/or the mobile display unit 10 at a given day and time from a variety of different sources 104a-104d. The computing system 102 may process the information for storage in a database 106 which may be hosted on a remote server 108 with the computing system 102.

A first source 104a may provide visual information relating to the geographic location A at which the mobile display unit 10 is positioned. For example, in one form the first source 104a may be representative of a camera which is included with the mobile display unit 10 and may be suitable for obtaining and transmitting photos or videos of the geographic location A surrounding the mobile display unit 10, along with the time and day the photos and/or videos were obtained. In one form for example, the photos and/or videos may be illustrative of the portion of the geographic location A which is positioned within the circle 14; i.e., a portion that is within the predetermined distance of the mobile display unit 10. The computing system 102 may be configured to analyze the photos and/or videos to determine various aspects of the geographic location A, including for example the total number of individuals 16 and individuals 18 present within the circle 14 or the predetermined distance of the mobile display unit 10. The computing system 102 may execute software configured to determine the total number of individuals 16 and individuals 18 present within the circle 14, or a person may analyze the photos and/or videos to determine the total number of individuals 16 and individuals 18 present within the circle 14 and then provide that information to the computing system 102 through a suitable input device (not shown) such as a keyboard or mouse. In either case, the resulting information may be organized and stored in the database 106.

The computing system 102 may be configured to assess and determine information relating to the individuals 16 and 18 other than the total number represented thereby. For example, in one or more embodiments, the computing system 102 may execute facial recognition software to identify a number of the individuals 16 and 18 that, in addition to being location within the circle 14, specifically look at the mobile display unit 10 for a predetermined period of time. This information may, for example, be considered representative of the number of individuals within the predetermined distance of the mobile display unit 10 who actually look at the information provided thereby. The facial recognition software, either alone or in combination with software configured to recognize body language, may also identify emotions of those who look at the mobile display unit 10 based on different facial expressions and/or body language. For example, the facial recognition software may determine the number of individuals who look at the mobile display unit 10 and smile, the number of individuals who look at the mobile display unit 10 and frown or scowl, and or the number of individuals who look at the mobile display unit 10 and point, shrug, or wave. In addition, analysis of the photos and/or videos by the computing system 102 may also identify various demographic details of the individuals 16 and 18 including for example gender and estimated age. After relevant analysis, the data obtained from the first source 104a may be stored in the database 106.

Additionally or alternatively, the first source 104a may obtain and provide information from third party sources which may be used to provide a total number of individuals 16 within the circle 14 or the predetermined distance of the mobile display unit 10. By way of example, the third party sources may include movie theatres, auditoriums, concert venues, or sports stadiums, just to provide a few examples, that provide information relating to the total number of people attending an event at the respective location at a particular time. With this information, assumptions may be made relating to the total number of people outside of and/or around the respective location at various times including a window of times before the beginning of the event and a window of time at the end of the event. Similarly, the total number of people outside the respective location at a given time may be considered to correspond to the total number of individuals 16 and individuals 18 present within the circle 14 when the mobile display unit 10 is at the respective location.

A second source 104b may provide information to the computing system 102 identifying the geographic location of the mobile display unit 10 at the time (or within some range thereof) the information from the first source 104a is obtained. For example, when the mobile display unit 10 includes a GPS device, the GPS device may identify and provide the geographic location of the mobile display unit 10 to the computing system 102. The GPS device may also provide the time and day the mobile display unit 10 is at a particular geographic location. The computing system 102 may analyze the information provided by the second source 104b and store it in the database 106 in association with the information stored in the database 106 that is obtained from the first source 104a.

A third source 104c may provide information relating to the unique device identifiers associated with the individuals 16 which are within the predetermined distance of the mobile display unit 10 at the time (or within some range thereof) the information from the first source 104a and the second source 104b is obtained. In one form for example, the third source 104c may be representative of a location-based marketing analytics provider, although other variations are possible. The computing system 102 may analyze the information provided by the third source 104c and store it in the database 106 in association with the information stored in the database 106 that is obtained from the first source 104a and the second source 104b.

The system 100 also includes a fourth source 104d which may provide information relating to the weather at the geographic location A at the time (or within some range thereof) when the information from the first source 104a, second source 104b and third source 104c is obtained. The fourth source 104d may be one or more sensors provided with the mobile display unit 10, or it may be a third-party providing weather related information. However, other variables are possible. The computing system 102 may analyze the information provided by the fourth source 104d and store it in the database 106 in association with the information stored in the database 106 that is obtained from the first source 104a, second source 104b, and third source 104c.

The data information collection described in connection with the system 100 may be repeated a number of times for a given geographic location such as location A or a number of other geographic locations within close proximity to or closely associated therewith. As additional data is collected, a more accurate representation of the typical total number of individuals 16 and 18, and the typical total number of individuals 16, within the predetermined distance of the mobile display unit 10 at a given location, on a specific day, at a particular time, and/or during particular weather may be provided. This representation may be subsequently used for determining an estimated total number of individuals within the predetermined distance of the mobile display unit 10 at the given location, on a specific day, at a particular time, and/or during particular weather based on the number of individuals 16 which are determined to be within the predetermined distance of the mobile display unit 10 at a later time and on the same day (or within a range thereof), the same time (or within a range thereof) and/or the same or similar weather. In addition, when collected and stored in the database 106, information relating to the number of individuals who look directly at the screen of the mobile display unit 10 for a predetermined period of time, optionally along with information relating to their emotions based on facial expression or body language recognition, and demographic information relating to the total number of individuals within the predetermined distance of the mobile display unit 10 may be used to estimate related information in connection with the total estimated number of individuals within the predetermined distance of the mobile display unit 10 at the later time.

Figure 3:
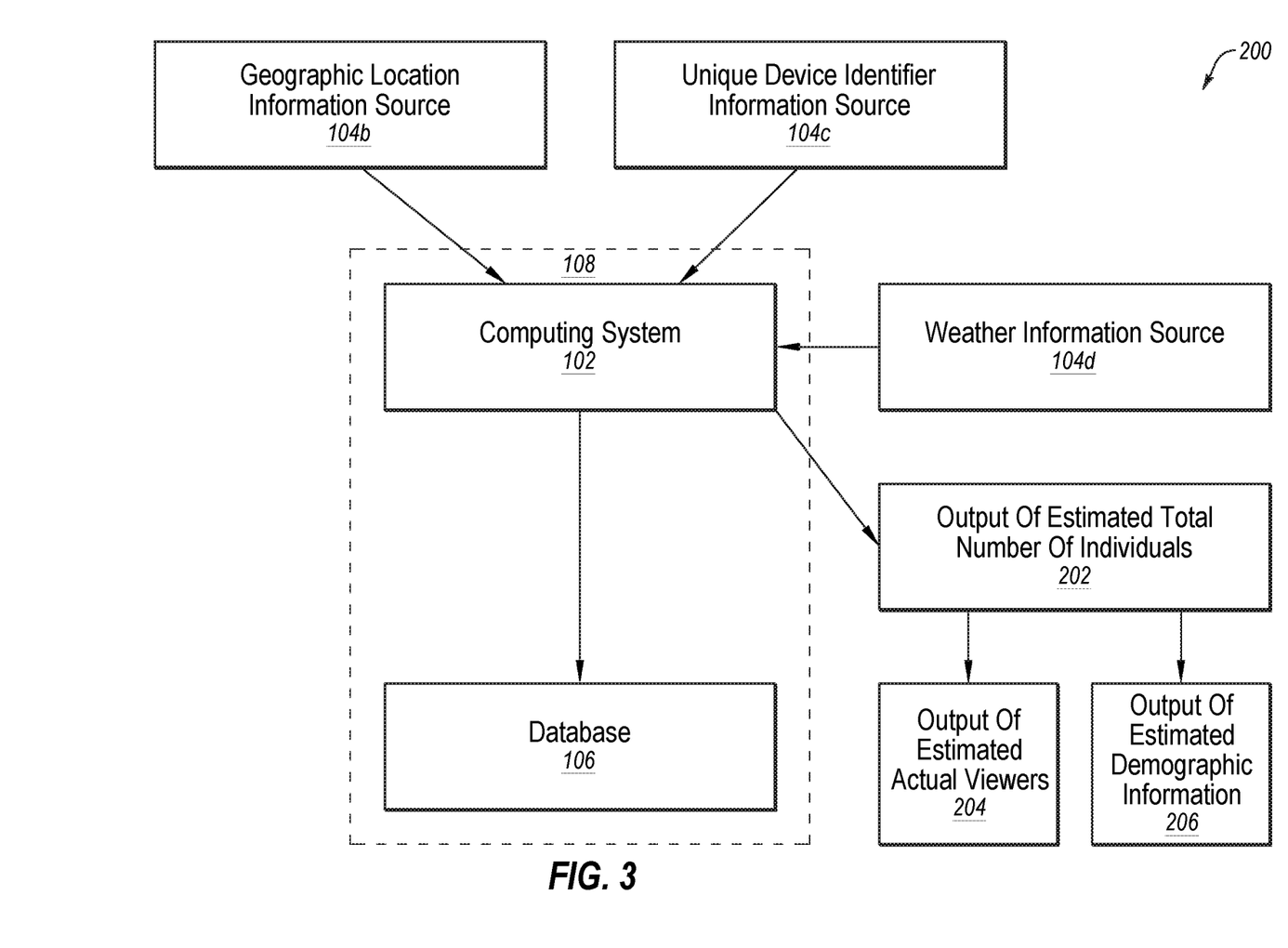
FIG. 3 is a schematic illustration of a system for estimating the number of people exposed to an outdoor display unit.

FIG. 3 is a schematic illustration of a system 200, where like numerals refer to like features previously described, for determining an estimated number of individuals exposed to or located within the predetermined distance of the mobile display unit 10. In this illustrative example, the determination of the total estimated number of individuals exposed to or located within the predetermined distance of the mobile display unit 10 is described in connection with geographic location A. However, this description is also relevant to the application of these principles for determining a total estimated number of individuals exposed to or located within the predetermined distance of the mobile display unit 10 at different geographic locations.

In the system 200, the second source 104b may provide information about the current geographic location of the mobile display unit 10. This information may also include information relating to the current time and day at which the mobile display unit 10 is present at the geographic location, which for illustrative purposes, is the geographic location A. The fourth source 104d may provide information relating to the current weather at the geographic location A. The computing system 102 may analyze the information provided by the second source 104b and the fourth source 104d and, after identifying that the mobile display unit 10 is located at the geographic location A, further identify relevant information for the geographic location A in the database 106 which has been established as a result of the collection of a number of data sets for the geographic location A as discussed above.

The relevant information in the database 106 may have the same or similar day/time and weather profiles as those provided by the second source 104b and the fourth source 104d, and may also include known values for the total number of individuals within the predetermined distance of the mobile display unit 10 and the number of individuals having unique electronic device identification information within the predetermined distance of the mobile display unit 10 associated with those or similar day/time and weather profiles. The third source 104c may provide to the computing system 102 the number of individuals having unique electronic device identification information within the predetermined distance of the mobile display unit 10. The computing system 102 may analyze this information, correlate it with the relevant information previously identified in the database 106, and from that determine the estimated total number of individuals within the predetermined distance of the mobile display unit 10 and provide it as an output 202. The estimated total number of individuals within the predetermined distance of the mobile display unit 10 may be considered to correspond to the number of individuals who had the opportunity to view the mobile display unit 10 at a given location on a given day and time.

To provide further clarity, and with reference to the example illustrated in FIG. 1, the data sets collected and stored in the database 106 may establish that on a typical weekday afternoon with clear weather, the total number of individuals 16 within the predetermined distance of the mobile display unit 10 having unique electronic identification information may comprise twenty five percent of the total individuals within the predetermined distance of the mobile display unit 10. Similarly, for a weekday afternoon with clear weather conditions at the location A when the third source 104c indicates there are ten individuals with unique electronic device identification information within the predetermined distance of the mobile display unit 10, the computing system 102 may determine that the total estimated number of people within the predetermined distance of the mobile display unit 10 is forty.

As another example relating to the geographical location A, the data sets collected and stored in the database 106 may establish that on a typical Tuesday morning between 7:30 and 9:30 A.M. with rainy weather, the total number of individuals 16 within the predetermined distance of the mobile display unit 10 having unique electronic identification information may comprise ten percent of the total individuals within the predetermined distance of the mobile display unit 10. Similarly, for a Tuesday morning between 7:30 and 9:30 A.M. with rainy weather at the location A when the third source 104c indicates there are five individuals with unique electronic device identification information within the predetermined distance of the mobile display unit 10, the computing system 102 may determine that the total estimated number of people within the predetermined distance of the mobile display unit 10 is fifty.

As yet another example relating to the geographical location A, the data sets collected and stored in the database 106 may establish that on a typical Saturday evening between 5:30 and 8:30 P.M. with clear weather, the total number of individuals 16 within the predetermined distance of the mobile display unit 10 having unique electronic identification information may comprise fifty percent of the total individuals within the predetermined distance of the mobile display unit 10. Similarly, for a Saturday evening between 5:30 and 8:30 P.M. with clear weather at the location A when the third source 104c indicates there are forty individuals with unique electronic device identification information within the predetermined distance of the mobile display unit 10, the computing system 102 may determine that the total estimated number of people within the predetermined distance of the mobile display unit 10 is eighty.

In addition to the output 202, the system 200 may also provide output 204 and output 206, although instances in which the system 200 only provides the output 202 are possible. In some embodiments, the output 204, where relevant information has been obtained and stored in the database 106, may be representative of an estimated number of individuals within the predetermined distance of the mobile display unit 10 who have looked directly at the screen of the mobile display unit for a predetermined period of time. Similarly, this information may be viewed as representative of the individuals who actually view the information provided by the mobile display unit 10 rather than those who are merely exposed to it within a distance from which it could be viewed. For example, the output 204 may be representative of an estimated number of individuals within the predetermined distance of the mobile display unit 10 who stared at the screen of the mobile display unit 10. By way of example, the data sets collected and stored in the database 106 may establish and identify, for a particular geographical location (which may also be associated with a particular time, day, and/or weather conditions, or range of values for any of the foregoing), a certain percentage of the total number of individuals within the predetermined distance of the mobile display unit 10 who look directly at the screen of the mobile display unit 10 for a predetermined period of time.

Based on this information, after determining the estimated total number of individuals within the predetermined distance of the mobile display unit 10 as discussed above, the computing system 102 may further determine the estimated number of individuals within the predetermined distance of the mobile display unit 10 who have looked directly at the screen of the mobile display unit 10 for the predetermined period of time. For example, in instances in which the information in the database 106 establishes that twenty percent of the total number of individuals within the predetermined distance of the mobile display unit 10 typically look directly at the screen of the mobile display unit 10 for the predetermined period of time, then the computing system 102 may correlate the determined, estimated number of total individuals within the predetermined distance of the mobile display unit 10 provided as the output 202 with this information to determine and provide as the output 204 an estimated number of individuals within the predetermined distance of the mobile display unit 10 who look directly at the screen of the mobile display unit 10 for the predetermined period of time.

Under this example, in response to the determined estimated total number of individuals within the predetermined distance of the mobile display unit 10 provided at the output 202 being twenty, the computing system 102 may determine that the estimated number of individuals within the predetermined distance of the mobile display unit 10 who look directly at the screen of the mobile display unit 10 for the predetermined period of time is four (i.e., twenty percent of twenty). It should be understood that the foregoing provides one approach for providing an estimated number of individuals within the predetermined distance of the mobile display unit 10 who look directly at it for the predetermined period of time. However, it is envisioned that other approaches may be used to determine and provide this information.

The output 206, where relevant information has been obtained and stored in the database 106, may be representative of estimated demographic details of individuals within the predetermined distance of the mobile display unit 10. By way of example, the data sets collected and stored in the database 106 may establish and identify, for a particular geographical location (which may also be associated with a particular time, day, and/or weather conditions, or range values for any of the foregoing), typical demographic details of individuals within the predetermined distance of the mobile display unit 10.

Based on this information, after determining the estimated total number of individuals within the predetermined distance of the mobile display unit 10 as discussed above, the computing system 102 may further determine the estimated demographic details of individuals within the predetermined distance of the mobile display unit 10. For example, in response to the information in the database 106 establishing that sixty percent of the total number of individuals within the predetermined distance of the mobile display unit 10 are typically females, then the computing system 102 may correlate the determined, estimated number of total individuals within the predetermined distance of the mobile display unit 10 provided as the output 202 with this information to determine and provide as the output 206 an estimated number of individuals within the predetermined distance of the mobile display unit 10 who are females.

Under this example, in response to the determined estimated total number of individuals within the predetermined distance of the mobile display unit 10 provided at the output 202 being fifty, then the computing system 102 may determine that the estimated number of individuals within the predetermined distance of the mobile display unit 10 who are females is thirty (i.e., sixty percent of fifty). With this information, the computing system 102 may also determine that twenty individuals within the predetermined distance of the mobile display unit 10 are males. While the foregoing approach has been described in connection with estimating gender of the individuals within the predetermined distance of the mobile display unit 10, it should be appreciated that the same or similar approach could be implemented for providing other estimated demographic details of the individuals within the predetermined distance of the mobile display unit 10. Moreover, while the foregoing provides one approach for providing estimated demographic details associated with the determined, estimated number of individuals within the predetermined distance of the mobile display unit 10, it is envisioned that other approaches may be used to determine and provide this information.

While the database 106 in the described examples may include information relating to the time/day and weather at a particular geographic location, it should be appreciated that forms in which this information is not included for a particular geographic location are also possible. For example, the information in the database 106 may be representative of and identify the total number of individuals typically within the predetermined distance of the mobile display unit 10 at a particular geographic location regardless of the time/day and/or weather. In these instances, the estimated total number of individuals within the predetermined distance of the mobile display unit 10 may be determined by the computing system 102 without accounting for these some or all of these characteristics of the geographic location.

Moreover, while the description of the system 200 indicates that the computing system 102 receives information relating to the time/day and/or weather information at the particular location, it should be appreciated that forms are possible where additional characteristics of the geographic location are provided and accounted for in determining the estimated total number of individuals within the predetermined distance of the mobile display unit 10 at the geographic location. In addition, forms are also possible in which information relating to the time/day, weather and/or other characteristics of the geographic location are not provided to the computing system 102 and the estimated total number of individuals within the predetermined distance of the mobile display unit 10 at the geographic location is determined without accounting for this information. For example, for instances where these additional characteristics of the geographic location are not provided to the computing system 102, information in the database 106 independent of these characteristics may be identified in order to identify the total number of individuals typically within the predetermined distance of the mobile display unit 10 at a particular geographic location without accounting for other characteristics of the geographic location even if they are included in the database 106.

In these instances, the estimated total number of individuals within the predetermined distance of the mobile display unit 10 may be determined by the computing system 102 without accounting for some or all of these characteristics of the geographic location. For example, the only current information obtained from the geographic location that may be used in determining the estimated total number of individuals within the predetermined distance of the mobile display unit 10 may be representative of the number of individuals having unique electronic device identification information within the predetermined distance of the mobile display unit 10.

In one or more forms, in response to the determined estimated total number of individuals and/or characteristics of the same within the predetermined distance of the mobile display unit 10, the computing system 102 may also provide instructions to the mobile display unit 10 to change the information provided by the mobile display unit 10 or the manner in which it is displayed. For example, in response to it being determined that the estimated total number of individuals within the predetermined distance of the mobile display unit is relatively high, and that a relatively high percentage of these individuals are males, then the computing system 102 may provide instructions resulting in the mobile display unit 10 providing information which may be tailored to males rather than females. As another example, in response to it being determined that the estimated number of individuals within the predetermined distance of the mobile display unit 10 who actually look at the mobile display unit 10 is relatively low, then the computing system 102 may provide instructions which changes the way the mobile display unit 10 provides the information with the intention of increasing attention thereto and the number of individuals who look at the mobile display unit 10. From the foregoing, it should be appreciated that a number of different actions may be taken in response to the estimates determined by the computing system 102.

Modifications, additions, or omissions may be made to the systems 100 and 200 without departing from the scope of the present disclosure. For example, the systems 100 and 200 may include more or fewer elements than those illustrated and described in the present disclosure. For example, one or both of the systems 100 and 200 may include any number of third-party devices associated with any number of entities.

Figure 4:
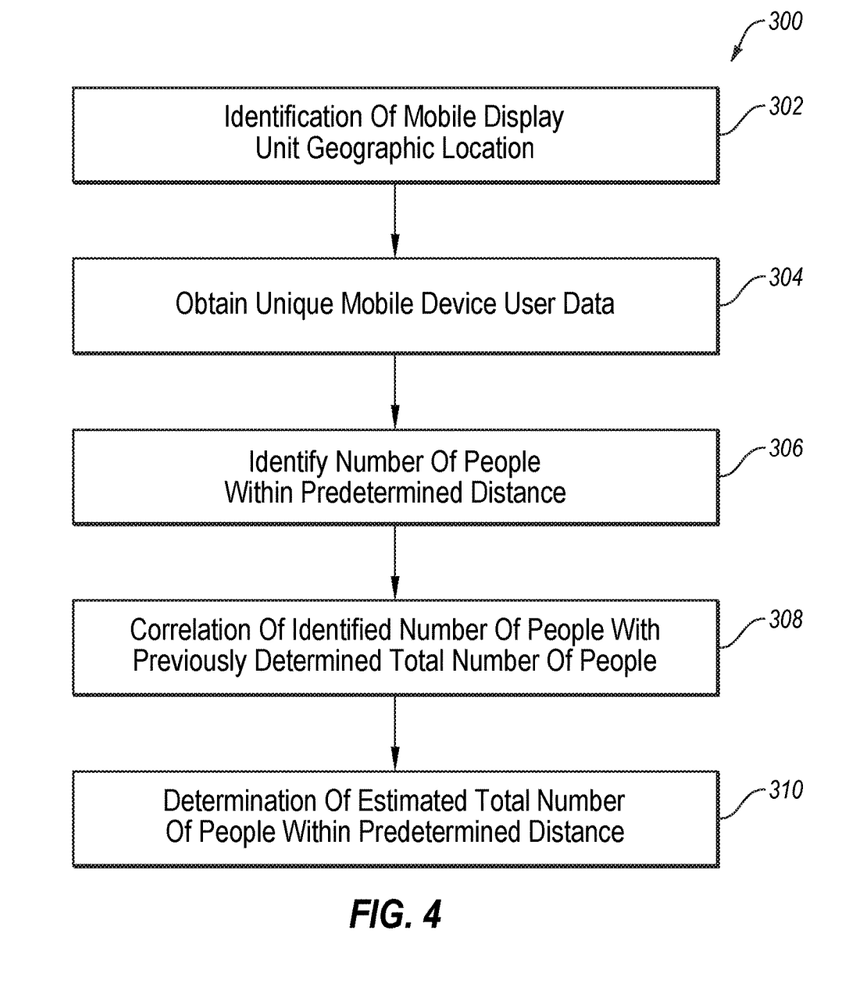
FIG. 4 is a flowchart of an example method for estimating the number of people exposed to an outdoor display unit.

FIG. 4 is a flowchart of an example method 300 for estimating the number of people exposed to or located within a predetermined distance of the mobile display unit 10. The method 300 may be arranged in accordance with at least one embodiment described in the present disclosure. One or more of the operations of the method 300 may be performed, in some embodiments, by a device or system, such as one or more elements of the system 100 of FIG. 2 or of the system 200 of FIG. 3. In these and other embodiments, the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 300 may include block 302 at which the geographic location of the mobile display unit 10 may be identified. For example, as indicated above, relevant information from a GPS device may be provided to determine or identify the location of the mobile display unit 10. Similarly, at block 302 identifying the geographic location of the mobile display unit 10 may include obtaining GPS data of the mobile display unit 10 corresponding to the geographic location. The GPS data may correspond to a number of different geographic locations of the mobile display unit 10 recorded over a period of time. In one form, the geographic location of the mobile display unit 10 may be identified when the mobile display unit 10 is mounted to a vehicle.

At block 304, data relating to unique mobile device users identified within a predetermined distance of the mobile display unit 10 at the geographic location may be obtained. In one aspect, this data may be obtained from unique electronic device identification information such as a MAID, although other variations are possible. The predetermined distance may, for example, correspond to a maximum distance from which content provided on a screen of the mobile display unit 10 may be viewed. At the block 304, the method 300 may also include determining one or more of time of day, weekday, and weather at the geographic location when the data relating to unique mobile device users within the predetermined distance of the mobile display unit 10 is identified.

At block 306, a number of people within the predetermined distance of the mobile display unit 10 at the geographic location may be identified based on the data obtained at the block 304. In one form, the identified number of people corresponds to the individuals within the predetermined distance of the mobile display unit 10 who have been identified as having unique electronic device identification information. At block 308, the number of people within the predetermined distance of the mobile display unit 10 identified at the block 306 may be correlated with a previously determined total number of people within the predetermined distance of the mobile display unit 10 at the geographic location and associated with a previously determined number of unique mobile device users within the predetermined distance of the mobile display unit 10 at the geographic location. The previously determined number of unique mobile device users within the predetermined distance of the mobile display unit 10 may correspond to unique mobile device users identified within the predetermined distance of the mobile display unit 10 at each of a number of different geographic locations.

At block 310 of the method 300, based on the correlating performed at the block 308, an estimated total number of people within the predetermined distance of the mobile display unit 10 at the geographic location may be determined. At block 310, the determination of the estimated total number of people within the predetermined distance of the mobile display unit 10 at the geographic location may be also be based on at least one of a time of day the mobile display unit 10 is at the geographic location, a day of the week the mobile display unit 10 is at the geographic location, and weather when the mobile display unit 10 is at the geographic location. For example, at block 310 the method 300 may also include comparing one or more of a determined time of day, weekday, and weather at the geographic location when the unique mobile device users within the predetermined distance of the mobile display unit 10 are identified with at least one of a previously determined time of day, weekday, and weather at the geographic location corresponding to a previously determined total number of people, and accounting for the comparison between the determined time of day, weekday, and weather at the geographic location when the unique mobile device users within the predetermined distance of the mobile display unit 10 are identified with at least one of the previously determined time of day, weekday, and weather at the geographic location corresponding to the previously determined total number of people in the estimated total number of people.

At block 310, estimated demographic details of the estimated total number of people may also be determined. For example, block 310 may involve determining the estimated demographic details by correlating the estimated total number of people with previously determined demographic details of the previously determined total number of people.

Modifications, additions, or omissions may be made to the method 300 without departing from the scope of the present disclosure. For example, some of the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments. For example, in some embodiments, the method 300 may include one or more of the operations described above with respect to FIGS. 2 and 3.

Figure 5:
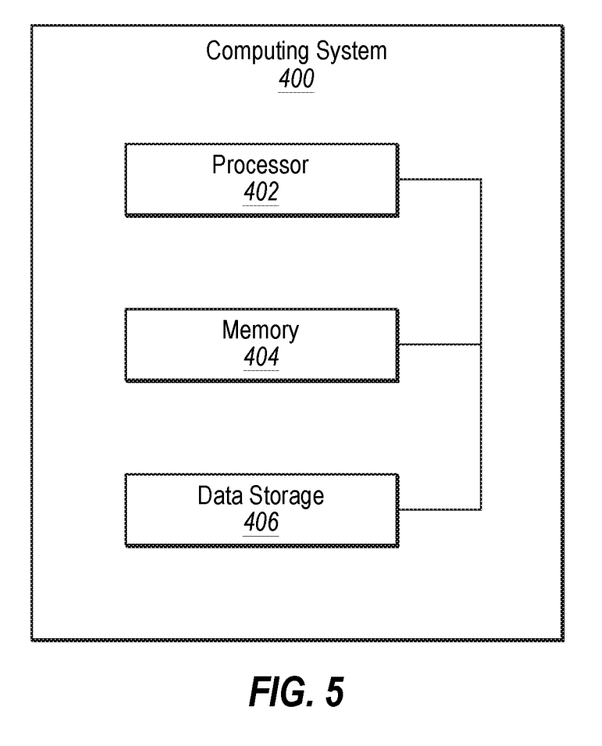
FIG. 5 illustrates an example computing system.

FIG. 5 illustrates a block diagram of an example computing system 400. The computing system 400 may be configured according to at least one embodiment of the present disclosure and may be an example of computing systems that may include or be part of one or more elements of the system 100 of FIG. 2 and/or the system 200 of FIG. 3. For example, system 100 or the system 200 may include one or more computing systems 400. For instance, the computing system 400 may be an example of the computing system 102 of FIGS. 2 and 3. The computing system 400 may include a processor 402, a memory 404, and a data storage 406. The processor 402, the memory 404, and the data storage 406 may be communicatively coupled. The processor 402 may correspond to the computing system 102 described herein, and the data storage 406 may correspond to the database 106 described herein.

In general, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 5, the processor 402 may include any number of processors configured to, individually or collectively, perform or direct performance of any number of operations described in the present disclosure. Additionally, one or more of the processors may be present on one or more different electronic devices, such as different servers.

In some embodiments, the processor 402 may be configured to interpret and/or execute program instructions and/or process data stored in the memory 404, the data storage 406, or the memory 404 and the data storage 406. In some embodiments, the processor 402 may fetch program instructions from the data storage 406 and load the program instructions in the memory 404. After the program instructions are loaded into memory 404, the processor 402 may execute the program instructions.

The memory 404 and the data storage 406 may include computer-readable storage media for carrying or having computer-executable instructions or data structures stored thereon. Such computer-readable storage media may include any available media that may be accessed by a general-purpose or special-purpose computer, such as the processor 402. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store program code in the form of computer-executable instructions or data structures and which may be accessed by a general-purpose or special-purpose computer. In these and other embodiments, the term "non-transitory" as explained herein should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

Modifications, additions, or omissions may be made to the computing system 400 without departing from the scope of the present disclosure. For example, in some embodiments, the computing system 400 may include any number of other components that may not be explicitly illustrated or described.

For instance, in some embodiments, the computing system 400 may include a communication unit that includes any component, device, system, or combination thereof that is configured to transmit or receive information over a network. In some embodiments, the communication unit may communicate with other devices at other locations, the same location, or even other components within the same system. For example, the communication unit may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit may permit data to be exchanged with a network and/or any other devices or systems described in the present disclosure. For example, the communication unit may allow the system 400 to communicate with other systems, such as computing devices and/or other networks.

Additionally or alternatively, the computing system 400 may include one or more user interfaces in some embodiments. The user interfaces may include any system or device to allow a user to interface with the system 400. For example, the interfaces may include a mouse, a track pad, a keyboard, and/or a touchscreen, among other devices or systems. The interfaces may also include a graphical user interface that may be presented on a display that may be included with the computing system 400. The display may be configured as one or more displays, like an LCD, LED, or other type of display. The display may be configured to present content such as video, text, user interfaces, and other data as directed by the processor.

As indicated above, the embodiments described in the present disclosure may include the use of a special purpose or general purpose computer (e.g., the processor 402 of FIG. 5) including various computer hardware or software modules, as discussed in greater detail below. Further, as indicated above, embodiments described in the present disclosure may be implemented using computer-readable media (e.g., the memory 404 or data storage 406 of FIG. 5) for carrying or having computer-executable instructions or data structures stored thereon.

In some embodiments, the different components, modules, engines, and services described herein may be implemented as objects or processes that execute on a computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used in the present disclosure to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
   identifying a geographic location of a mobile display unit configured to display information in an outdoor environment;
   obtaining data relating to a number of unique mobile device users identified within a predetermined distance of the mobile display unit at the geographic location;
   identifying, based on the obtained data, a first number of people within the predetermined distance of the mobile display unit at the geographic location;
   correlating the first number of people with a previously determined total number of people within the predetermined distance of the mobile display unit at the geographic location and associated with a previously determined number of unique mobile device users within the predetermined distance of the mobile display unit at the geographic location;
   determining, based on the correlating, an estimated total number of people within the predetermined distance of the mobile display unit at the geographic location; and
   determining estimated demographic details of the estimated total number of people;
   wherein determining the estimated demographic details includes correlating the estimated total number of people with previously determined demographic details of the previously determined total number of people.

2. The method of claim 1, wherein determining the estimated total number of people within the predetermined distance of the mobile display unit at the geographic location is further based on at least one of a time of day the mobile display unit is at the geographic location, a day of the week the mobile display unit is at the geographic location, and weather when the mobile display unit is at the geographic location.

3. The method of claim 1, wherein the mobile display unit is mounted to a vehicle.

4. The method of claim 1, wherein identifying the geographic location of the mobile display unit includes obtaining GPS data of the mobile display unit corresponding to the geographic location.

5. The method of claim 4, wherein the GPS data corresponds to a number of different geographic locations of the mobile display unit recorded over a period of time.

6. The method of claim 5, wherein the previously determined number of unique mobile device users corresponds to the unique mobile device users identified within the predetermined distance at each of the geographic locations.

7. A system comprising:
one or more processors; and
one or more non-transitory computer-readable media containing instructions which, in response to being executed by the one or more processors, cause the system to perform operations comprising:
identifying a geographic location of a mobile display unit structured to display information in an outdoor environment;
identifying unique mobile device users within a predetermined distance of the mobile display unit at the geographic location;
identifying a first number of people within the predetermined distance of the mobile display unit at the geographic location;
correlating the first number of people with a previously determined total number of people within the predetermined distance of the mobile display unit at the geographic location and associated with a previously determined number of unique mobile device users within the predetermined distance of the mobile display unit at the geographic location;
determining, based on the correlating, an estimated total number of people within the predetermined distance of the mobile display unit at the geographic location; and
determining estimated demographic details of the estimated total number of people;
wherein determining the estimated demographic details includes correlating the estimated total number of people with previously determined demographic details of the previously determined total number of people.

8. The system of claim 7, wherein the operations further comprise obtaining GPS data of the mobile display unit corresponding to the geographic location.

9. The system of claim 7, wherein the operations further comprise determining estimated demographic details of the estimated total number of people.

10. The system of claim 7, wherein the predetermined distance corresponds to a maximum distance from which content provided on a screen of the mobile display unit may be viewed.

11. The system of claim 7, wherein the mobile display unit is mounted to a vehicle.

12. One or more non-transitory computer-readable media containing instructions which, in response to being executed by one or more processors, cause a system to perform operations comprising:

identifying a geographic location of a mobile display unit structured to display information in an outdoor environment;
identifying a number of unique mobile device users within a predetermined distance of the mobile display unit at the geographic location;
determining an estimated total number of people within the predetermined distance of the mobile display unit at the geographic location by comparing the number of unique mobile device users identified within the predetermined distance of the mobile display unit at the geographic location with a previously determined total number of people within the predetermined distance of the mobile display unit at the geographic location which includes a predetermined number of unique mobile device users within the predetermined distance of the mobile display unit at the geographic location;
determining one or more of time of day, weekday, and weather at the geographic location when the unique mobile device users within the predetermined distance of the mobile display unit are identified;
comparing one or more of the determined time of day, weekday, and weather at the geographic location when the unique mobile device users within the predetermined distance of the mobile display unit are identified with at least one of a previously determined time of day, weekday, and weather at the geographic location corresponding to the previously determined total number of people; and
accounting for the comparison between the determined time of day, weekday, and weather at the geographic location when the unique mobile device users within the predetermined distance of the mobile display unit are identified with at least one of the previously determined time of day, weekday, and weather at the geographic location corresponding to the previously determined total number of people in the estimated total number of people.

13. The computer-readable media of claim 12, wherein the operations further comprise obtaining GPS data corresponding to the geographic location.

14. The computer-readable media of claim 12, wherein the operations further comprise determining estimated demographic details of the estimated total number of people.

* * * * *